United States Patent
Murata et al.

(10) Patent No.: US 8,301,213 B2
(45) Date of Patent: Oct. 30, 2012

(54) ELECTRONIC DEVICE INCLUDING A WATERPROOF SHEET MEMBER

(75) Inventors: Wataru Murata, Kawasaki (JP); Takeshi Komuro, Kawasaki (JP); Manabu Hongo, Kawasaki (JP); Hidekatsu Kobayashi, Kawasaki (JP); Takashi Suzuki, Kawasaki (JP); Ryo Hattori, Kawasaki (JP); Kouki Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 12/605,542

(22) Filed: Oct. 26, 2009

(65) Prior Publication Data

US 2010/0113108 A1    May 6, 2010

(30) Foreign Application Priority Data

Oct. 31, 2008   (JP) ................. 2008-281562

(51) Int. Cl.
*H04M 1/00* (2006.01)
(52) U.S. Cl. .................................. 455/575.8
(58) Field of Classification Search ............. 455/575.1, 455/575.8, 550.1; 381/386, 189; 379/433.01, 379/437, 420.02, 428.01, 432, 43.022; 181/149; 382/398, 431
See application file for complete search history.

(56) References Cited

U.S. PATENT DOCUMENTS

| | | | |
|---|---|---|---|
| 6,987,860 B2 * | 1/2006 | Kurihara et al. | 381/386 |
| 7,561,684 B2 * | 7/2009 | Tsutaichi et al. | 379/433.01 |
| 7,577,345 B2 * | 8/2009 | Tei et al. | 396/29 |
| 8,032,195 B2 * | 10/2011 | Yamaguchi et al. | 455/575.8 |
| 2005/0067216 A1 * | 3/2005 | Schuhmann et al. | 181/149 |
| 2010/0113108 A1 * | 5/2010 | Murata et al. | 455/575.1 |

FOREIGN PATENT DOCUMENTS

| | | |
|---|---|---|
| JP | 07-131375 A | 5/1995 |
| JP | 2001-135945 A | 5/2001 |

OTHER PUBLICATIONS

Japanese Office Action dated May 22, 2012, issued in corresponding Japanese Patent Application No. 2008-281562, with Partial English translation (5 pages).

* cited by examiner

*Primary Examiner* — Nay A Maung
*Assistant Examiner* — Angelica Perez
(74) *Attorney, Agent, or Firm* — Westerman, Hattori, Daniels & Adrian, LLP

(57) ABSTRACT

An electronic device includes an outer case having a sound hole, an acoustic unit included in the outer case in a position corresponding to a position of the sound hole, a sheet member provided between the acoustic unit and the outer case in a position corresponding to the position of the sound hole, and placed over the acoustic unit to cover an outside of an outer edge of the acoustic unit, a mounting portion circumferentially provided on an outer peripheral portion of the sheet member and mounted to the outer case, and an extension portion that extends the mounting portion toward an inner periphery thereof on a side of the sheet member facing the acoustic unit and to which the acoustic unit is mounted.

6 Claims, 9 Drawing Sheets

ELECTRONIC DEVICE INCLUDING A WATERPROOF SHEET MEMBER

CROSS-REFERENCE TO RELATED APPLICATIONS

This application is based upon and claims the benefit of priority of the prior Japanese Patent Application No. 2008-281562, filed on Oct. 31, 2008, the entire contents of which are incorporated herein by reference.

FIELD

The present invention relates to an electronic device.

BACKGROUND

An outer case of an electronic device including therein an acoustic unit such as a speaker unit has a sound hole through which the acoustic unit emits or collects sound. The outer case includes therein various electrical circuits or the like, and thus needs to block entry of moisture through the sound hole to protect the electrical circuits or the like. A conventional proposal for a waterproof structure for blocking entry of moisture into such an outer case to protect electronic components has been known (see Japanese Laid-open Patent Publication No. 07-131375).

Figure 8:
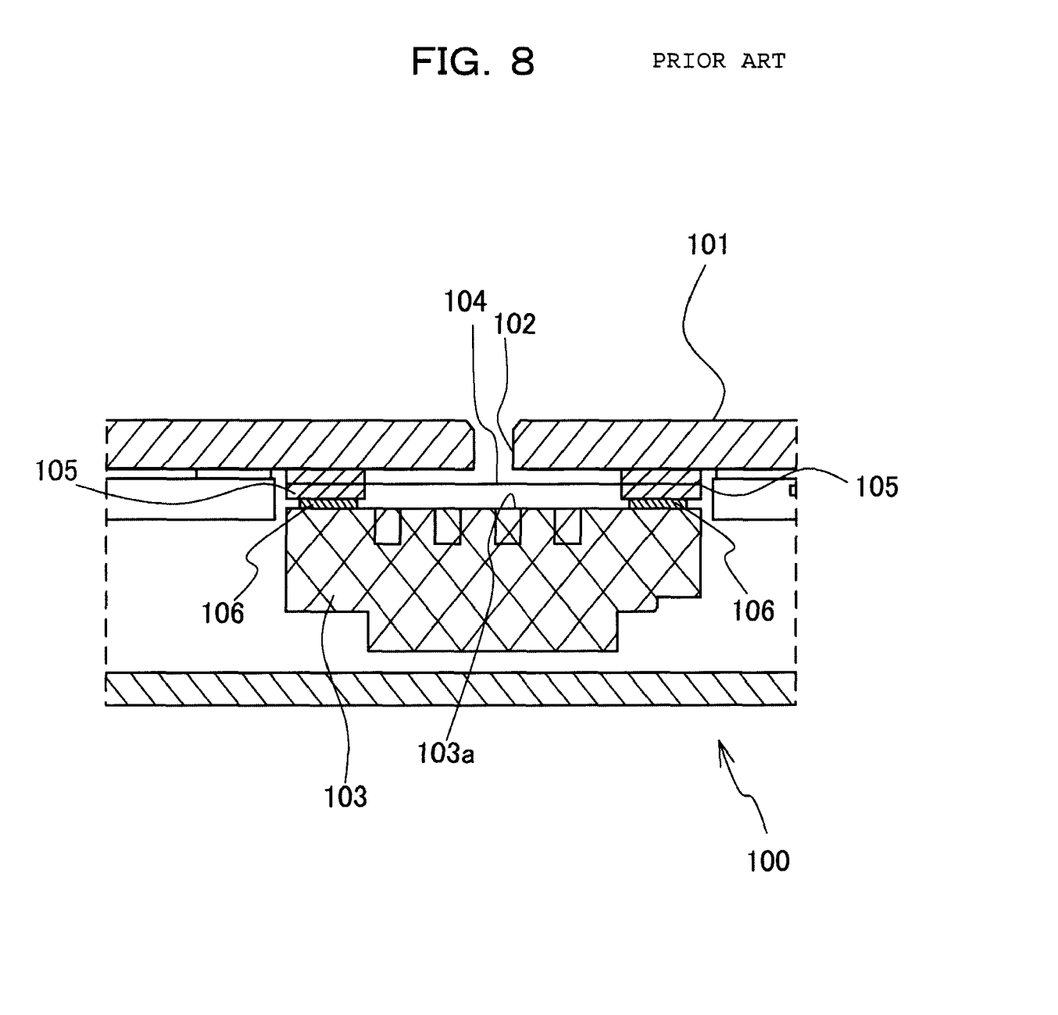
FIG. 8 illustrates a conventional example.

FIG. 8 illustrates a conventional waterproof structure for blocking entry of moisture into an electronic device 100. FIG. 8 illustrates the waterproof structure in section.

An outer case 101 of the electronic device 100 has a sound hole 102. The outer case 101 includes therein an acoustic unit 103 in a position corresponding to a position of the sound hole 102. Also, a sheet member 104 is provided between the outer case 101 and the acoustic unit 103. The sheet member 104 is a water repellent sheet. The sheet member 104 blocks entry of moisture into the outer case 101 through the sound hole 102.

A mounting portion 105 mounted to the outer case 101 is circumferentially provided on an outer peripheral portion of the sheet member 104. The mounting portion 105 is formed by bonding a cushion material or a rigid material to the outer peripheral portion of the sheet member 104. The mounting portion 105 is mounted in tight contact with an inner surface of the outer case 101. The acoustic unit 103 is mounted to the mounting portion 105. A double-faced tape 106 is provided as a buffer between the mounting portion 105 and the acoustic unit 103. The double-faced tape 106 increases sealability around the acoustic unit 103 and prevents sound leakage from the acoustic unit 103. The double-faced tape 106 is placed on an outer periphery of the acoustic unit 103 so as not to close a sound emitting portion 103a having a hole for emitting or collecting sound. A cushion material may replace the double-faced tape 106.

The sheet member 104 blocks entry of moisture into the outer case 101, and also attenuates sound emitted or collected by the acoustic unit 103. Thus, the sheet member 104 needs to have a minimum area required for maintaining desired acoustic characteristics of the electronic device 100. The minimum area required for the sheet member 104 is an area corresponding to acoustic characteristics such as sound pressure of the acoustic unit 103.

Meanwhile, acoustic units have been reducing in size corresponding to an increasing need for a reduction in size of electronic devices. Recent small-sized acoustic units have been able to exhibit acoustic characteristics such as sound pressure equal to those of conventional acoustic units.

Figure 9:
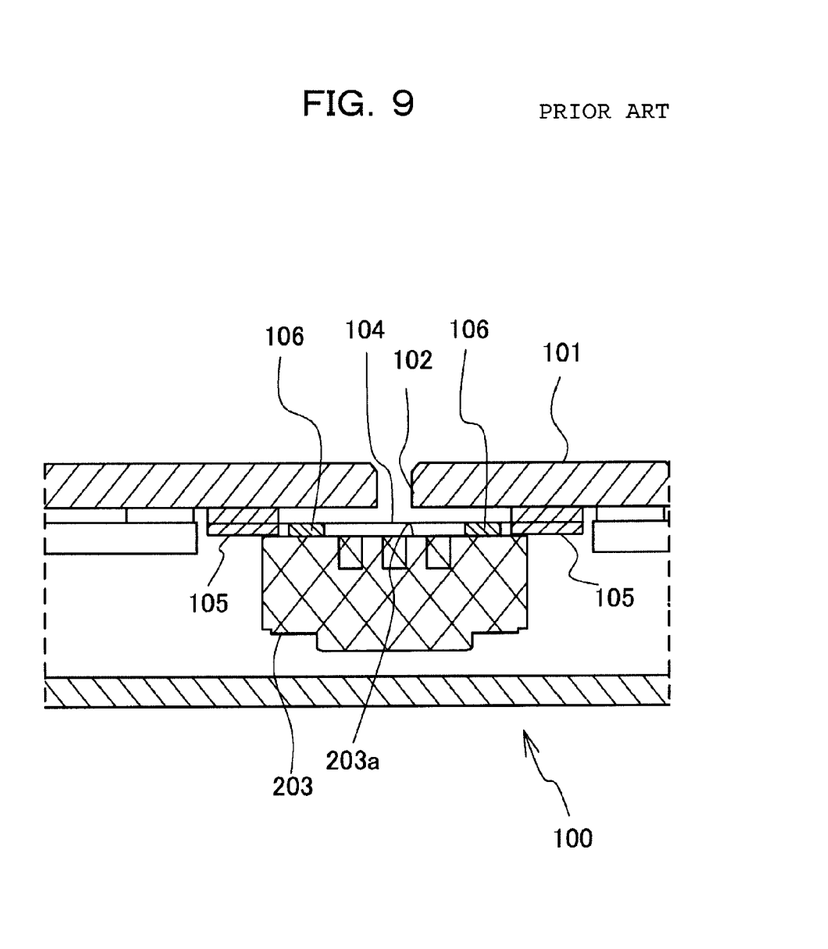
FIG. 9 illustrates problems of the conventional example.

However, if a small-sized acoustic unit that can exhibit the same acoustic characteristics as a conventional unit is mounted in an electronic device, the following problems occur in terms of the need for the sheet member 104. The problems will be described with reference to FIG. 9. FIG. 9 illustrates in section a state where the outer case 101 includes therein an acoustic unit 203 having a smaller size than the acoustic unit 103 in FIG. 8 instead of the acoustic unit 103. The acoustic unit 203 has acoustic characteristics equal to those of the acoustic unit 103.

When the small-sized acoustic unit 203 is used, a sheet member 104 needs to have an area equal to that of the conventional acoustic unit. Thus, the same sheet member 104 as illustrated in FIG. 8 is used. A mounting portion 105 is circumferentially provided on an outer peripheral portion of the sheet member 104, and this is the same as in FIG. 8.

When the same sheet member 104 is used conventionally, the small-sized acoustic unit 203 may be located inside the circumferentially provided mounting portion 105. In such a state, the acoustic unit 203 cannot be mounted to the mounting portion 105. Specifically, a double-faced tape 106 provided on an outer periphery of the mounting portion 105, so as not to close a hole 203a of the acoustic unit 203 for emitting or collecting, sound comes into direct contact with the sheet member 104. This may cause break or failure of the sheet member 104. The breakage or failure of the sheet member 104 prevents an appropriate waterproof effect from being maintained.

SUMMARY

According to the described embodiments, an electronic device includes an outer case having a sound hole, an acoustic unit included in the outer case in a position corresponding to a position of the sound hole, a sheet member provided between the acoustic unit and the outer case in a position corresponding to the position of the sound hole, and placed over the acoustic unit to cover an outside of an outer edge of the acoustic unit, a mounting portion circumferentially provided on an outer peripheral portion of the sheet member and mounted to the outer case, and an extension portion that extends the mounting portion toward an inner periphery thereof on a side of the sheet member facing the acoustic unit and to which the acoustic unit is mounted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described with reference to the accompanying drawings. In the drawings, sizes or ratios of components are not illustrated completely equal to actual ones in some cases. Details are omitted in some drawings.

[Embodiment 1]

Figure 1:
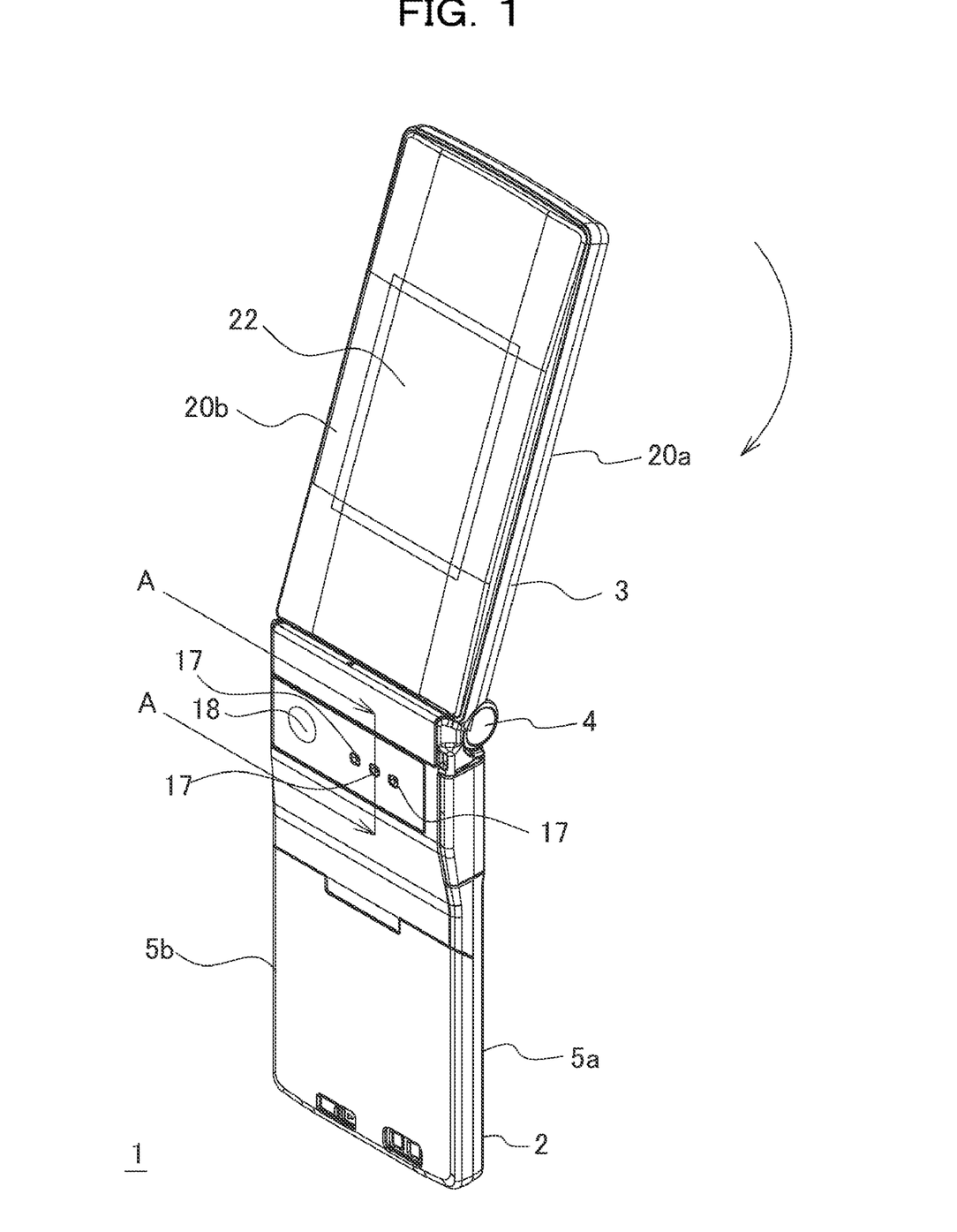
FIG. 1 is an appearance view of a mobile phone according to Embodiment 1.
Figure 2:
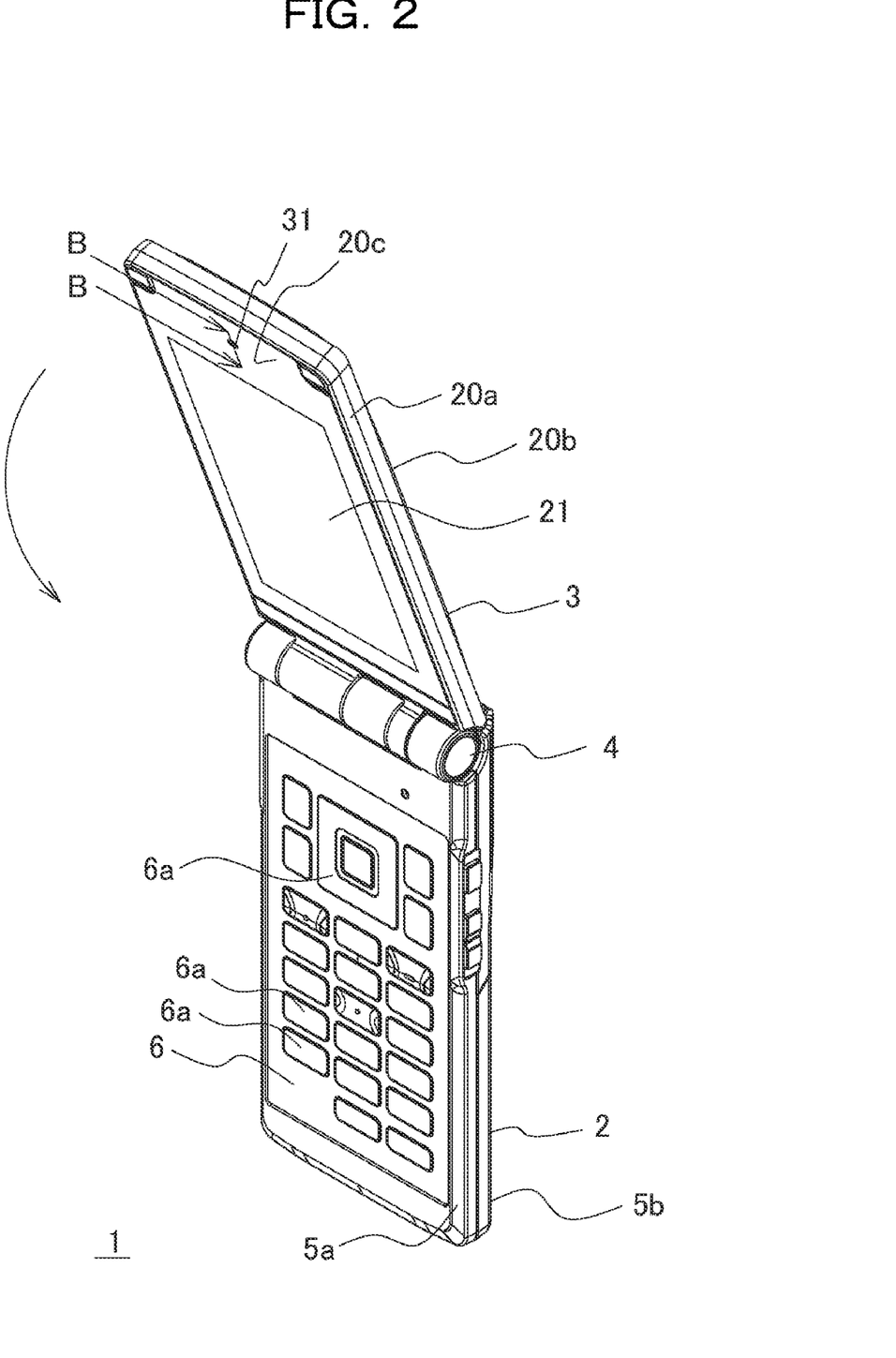
FIG. 2 is an appearance view of the mobile phone according to Embodiment 1.

FIG. 1 and FIG. 2 are an appearance view of a mobile phone 1. FIG. 1 is an appearance view of the mobile phone 1 viewed from a rear side, and FIG. 2 is an appearance view of the mobile phone 1 viewed from a front side facing a user when in use. The mobile phone 1 includes a fixed portion 2 and a movable portion 3. The fixed portion 2 and the movable portion 3 are connected by a hinge portion 4. As illustrated in FIG. 1 or 2, the movable portion 3 can be opened from the fixed portion 2 in the mobile phone 1. The mobile phone 1 can be folded so that the movable portion 3 is placed over the fixed portion 2.

Figure 3:
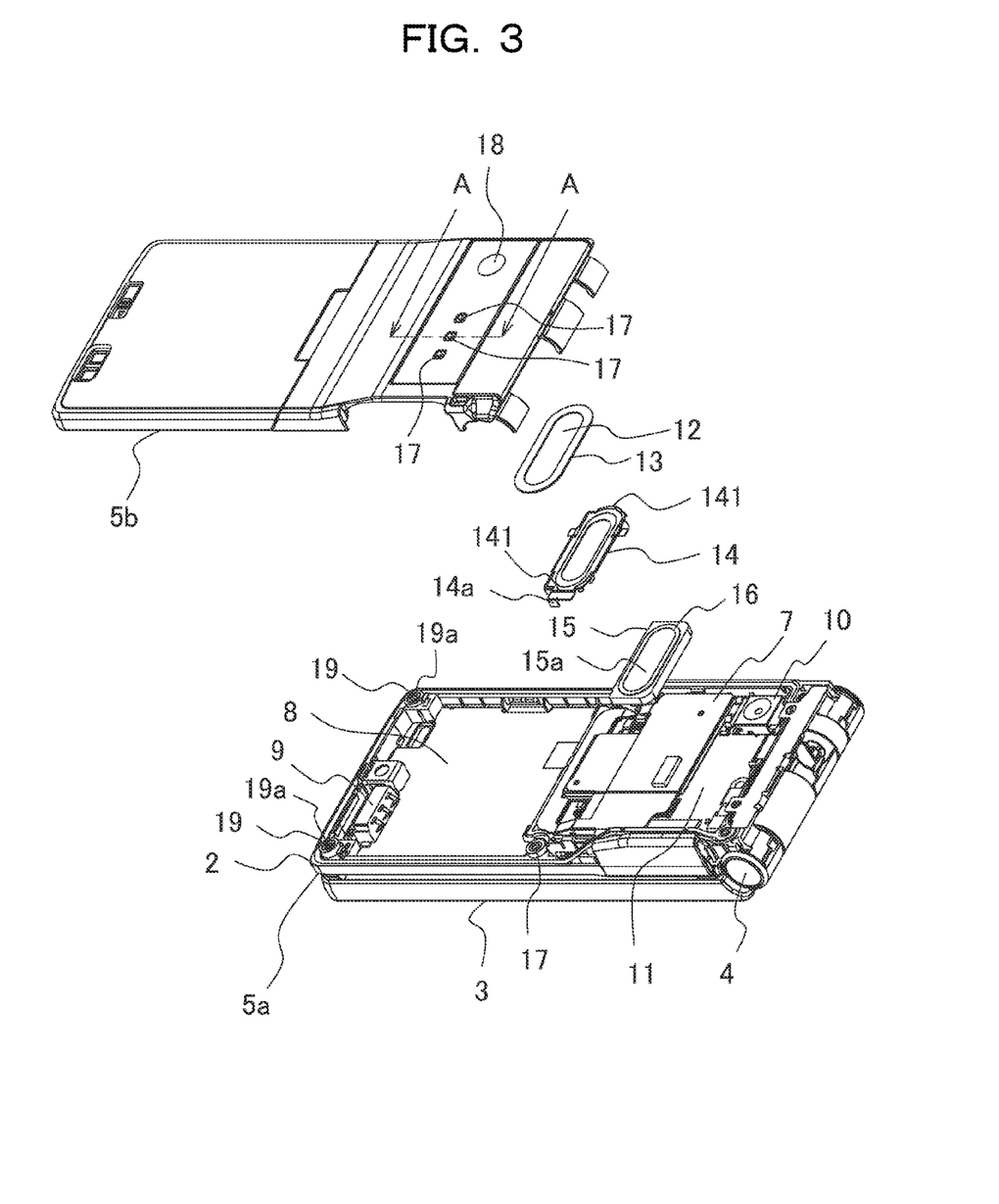
FIG. 3 illustrates a fixed portion in an exploded manner.

The fixed portion 2 will be described. FIG. 3 illustrates a fixed portion in an exploded manner. The fixed portion 2 includes an outer case formed by a combination of a front case 5a and a rear case 5b. The front case 5a and the rear case 5b form the outer case by fastening a screwing portion 19 with a screw 19a. The rear case 5b has three sound holes 17. The front case 5a has an operation surface 6 on which various operation buttons 6a are provided as illustrated in FIG. 2. The front case 5a includes therein a speaker unit 15 in a position corresponding to a position of the sound hole 17. The front case 5a includes therein a first substrate unit 7. In the front case 5a, a battery mounting portion 8 is formed, and a battery connector 9 to which a battery mounted in the battery mounting portion 8 is connected is provided. The front case 5a includes therein a camera unit 10, and a lens hole 18 is formed in the rear case 5b in a position corresponding to a mounting position of the camera unit 10. A speaker unit mounting portion 11 is formed on a lateral side of the camera unit 10, and the speaker unit 15 is mounted in the speaker unit mounting portion 11. The speaker unit 15 corresponds to an acoustic unit.

Figure 4A:
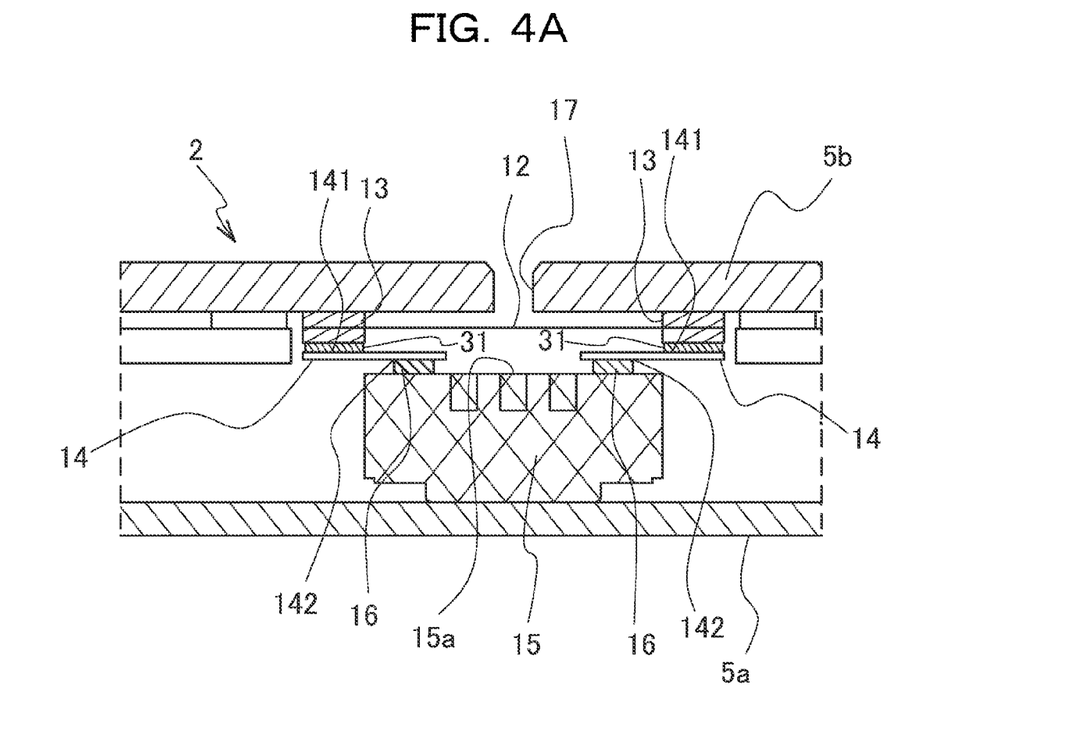
FIG. 4A illustrates the fixed portion in an assembled manner in section taken along the line A-A in FIGS. 1 and 3.
Figure 4B:
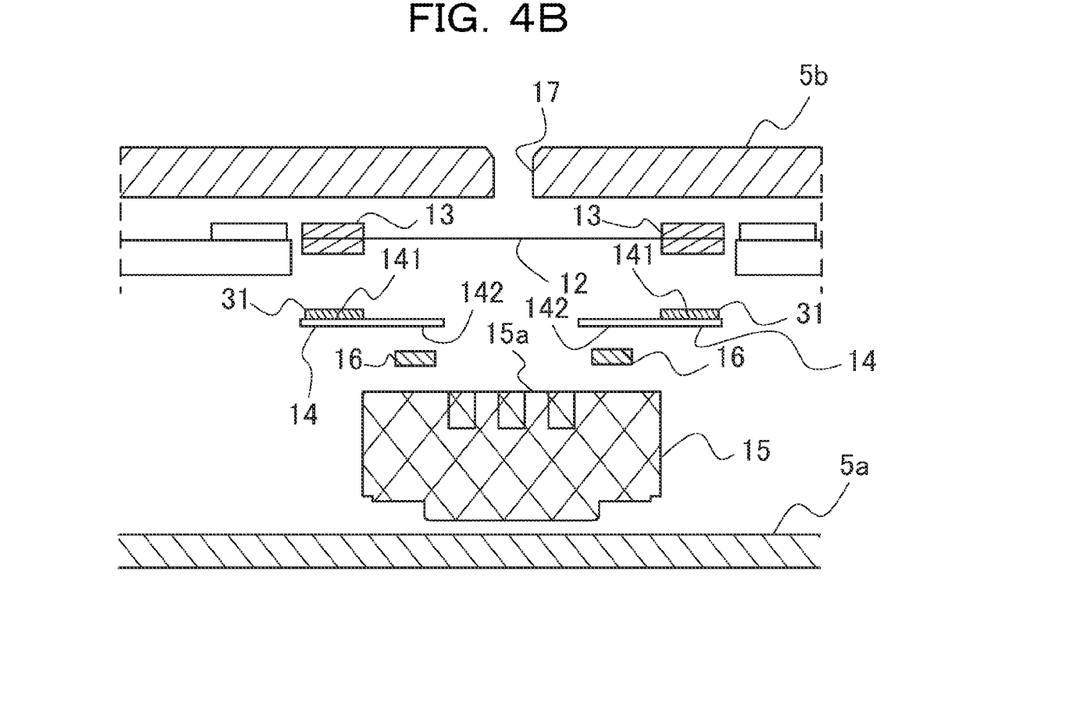
FIG. 4B illustrates components in FIG. 4A in an exploded manner.

FIG. 4A illustrates the fixed portion in an assembled manner in section taken along the line A-A in FIGS. 1 and 3. FIG. 4B illustrates components in FIG. 4A in an exploded manner. As illustrated in FIGS. 3, 4A and 4B, the fixed portion 2 of the mobile phone 1 includes therein a sheet member 12. The sheet member 12 is formed of a water repellent material. Specifically, tetrafluoroethylene is formed into a porous sheet and used. The sheet member 12 allows passage of air but blocks passage of water. The sheet member 12 may be formed of other materials as long as it can pass air and block entry of water. The sheet member 12 has a minimum area required based on acoustic characteristics such as sound pressure of the speaker unit 15. The sheet member 12 in this embodiment ensures an area that can sufficiently exhibit acoustic characteristics of the speaker unit 15.

As illustrated in FIG. 4A, the sheet member 12 is provided between the speaker unit 15 and the rear case 5b that forms the outer case in a position corresponding to the position of the sound hole 17. The sheet member 12 is placed over the speaker unit 15 to cover an outside of an outer edge of the speaker unit 15.

Such a relationship between the size of the speaker unit 15 and the area of the sheet member 12 results from the speaker unit 15 being reduced in size while maintaining satisfactory acoustic characteristics. Specifically, a small-sized high performance speaker unit requires a sheet member having an area to cover the speaker unit, and thus such a relationship is established.

A mounting portion 13 mounted to the rear case 5b that forms the outer case is circumferentially provided on an outer peripheral portion of the sheet member 12. The mounting portion 13 is formed by bonding a cushion material as an example of a buffer to the outer peripheral portion of the sheet member 12. The mounting portion 13 is mounted in tight contact with an inner peripheral surface of the rear case 5b. The mounting portion 13 may be formed of a rigid material instead of the cushion material. The mounting portion 13 is an interposed portion when the sheet member 12 is mounted to the rear case 5b. Thus, the mounting portion 13 is circumferentially provided on the outer peripheral portion of the sheet member 12. The mounting portion 13 is provided over the entire outer peripheral portion of the sheet member 12 to ensure a waterproof function. Thus, the mounting portion 13 provided over the entire outer peripheral portion of the sheet member 12 also has a function of preventing sound leakage from the speaker unit 15.

A first extension member 14 is mounted to the mounting portion 13. Specifically, the fixed portion 2 has the first extension member 14 that extends the mounting portion 13 toward an inner periphery thereof on a side of the sheet member 12 facing the speaker unit 15. The speaker unit 15 is mounted to the first extension member 14.

The first extension member 14 is a circumferential plate formed of sheet metal which forms an extension portion. The first extension member 14 formed of sheet metal is formed to be thin while ensuring necessary strength. The first extension member 14 has a mounting pawl 14a and is secured to the speaker unit mounting portion 11 by the mounting pawl 14a.

An outer peripheral portion front surface 141 of the first extension member 14 as the circumferential plate is mounted to the mounting portion 13, and an inner peripheral portion back surface 142 is mounted to the speaker unit 15. A double-faced tape 31 as an example of a buffer is provided between the first extension member 14 and the mounting portion 13. A double-faced tape 16 as an example of a buffer is also provided between the first extension member 14 and the speaker unit 15. The double-faced tapes 16 and 31 provide a bonding function, also increase sealability around the speaker unit 15, and prevent sound leakage from the speaker unit 15. The double-faced tape 16 is provided on the outer periphery of the speaker unit 15 so as not to close a sound emitting portion 15a having a hole for emitting sound. A cushion material may replace the double-faced tape 16. An adhesive may be used to bond the first extension member 14 to the mounting portion 13 and bond the first extension member 14 to the speaker unit 15.

Thus, the first extension member 14 is provided to prevent the small-sized speaker unit 15 from coming into direct contact with the sheet member 12. This can avoid break or failure of the sheet member 12, and maintain a waterproof effect of the fixed portion 2. As described above, the sheet member 12 ensures the area that can sufficiently exhibit acoustic characteristics of the speaker unit 15. The first extension member 14 does not come into direct contact with the sheet member 12, and a gap is formed between the first extension member 14 and the sheet member 12. Thus, the area of the sheet member 12 that has an influence on acoustic characteristics is not reduced. Therefore, the first extension member 14 does not deteriorate the acoustic characteristics of the speaker unit 15.

As described above, the waterproof effect of the fixed portion 2 is ensured. The acoustic effect of the mobile phone 1 is also maintained.

Figure 5:
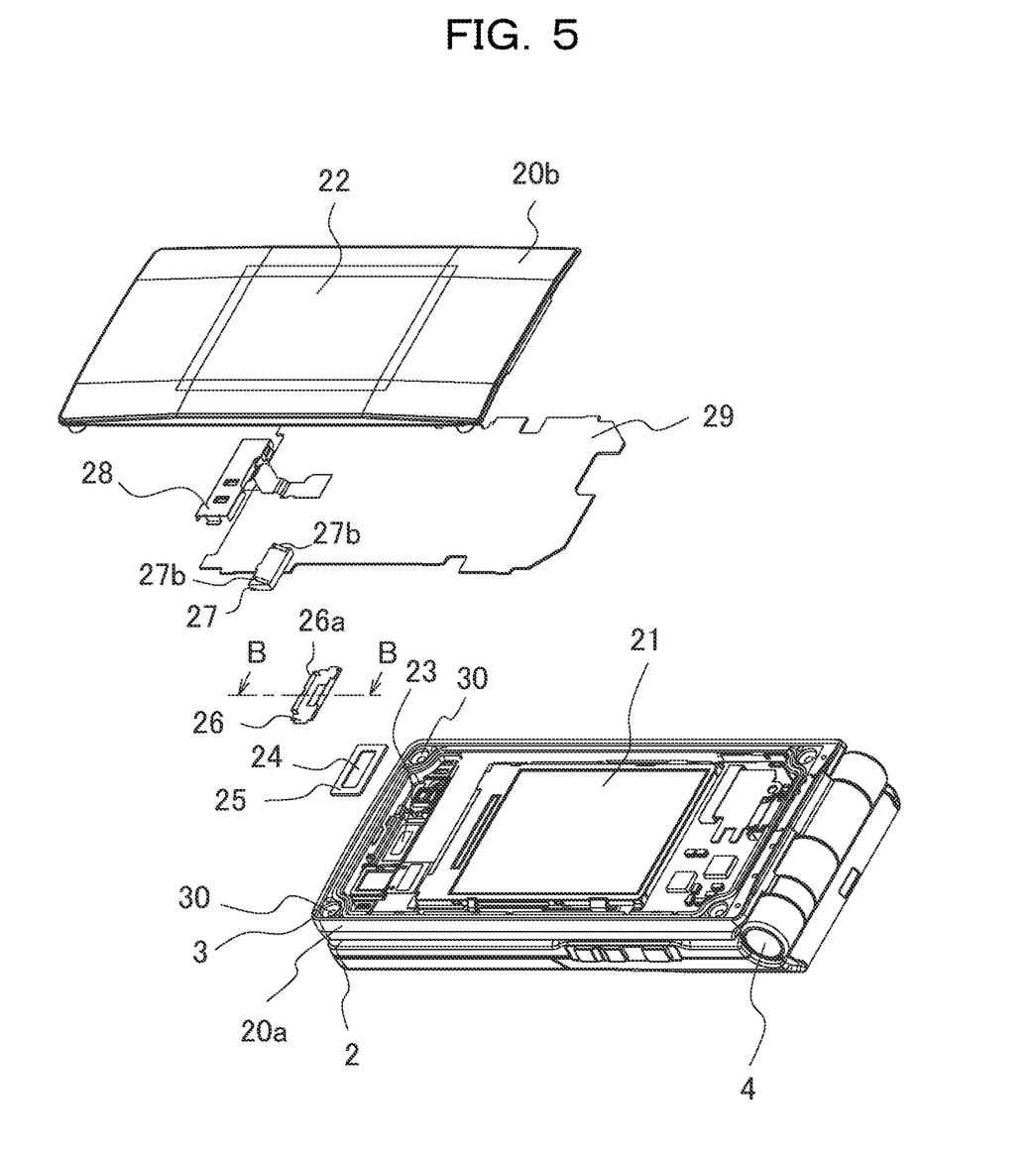
FIG. 5 illustrates a movable portion in an exploded manner.

The movable portion 3 will be described. FIG. 5 illustrates a movable portion in an exploded manner. The movable portion 3 includes an outer case formed by a combination of a front case 20a and a rear case 20b. A clear cover 20c is mounted to a surface of the front case 20a. The front case 20a and the rear case 20b form the outer case by fastening screwing portions 30 with screws. The front case 20a has a sound hole 23. The clear cover 20c has a sound hole 31 in a position corresponding to a position of the sound hole 23. The sound holes 23 and 31 are provided in a position on an upper side when the mobile phone 1 is opened as illustrated in FIG. 2.

A main display unit 21 is mounted in the front case 20a. The front case 20a includes therein a receiver unit 27 in a position corresponding to the position of the sound hole 23. The receiver unit 27 corresponds to an acoustic unit in the present invention. The receiver unit 27 is mounted to a flexible substrate 28. The receiver unit 27 has a spring contact 27b, and the spring contact 27b is in contact with the flexible substrate 28. The front case 20a includes therein a second substrate unit 29. The flexible substrate 28 is connected to the second substrate unit 29. The rear case 20b has a sub-display unit 22.

Figure 6A:
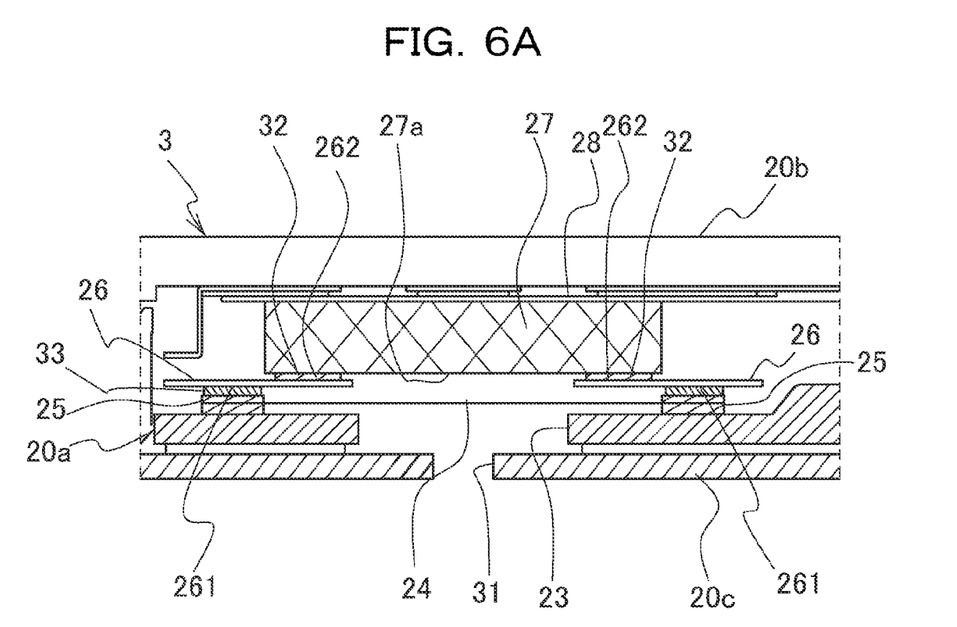
FIG. 6A illustrates the movable portion in an assembled manner in section taken along the line B-B in FIGS. 2 and 5.
Figure 6B:
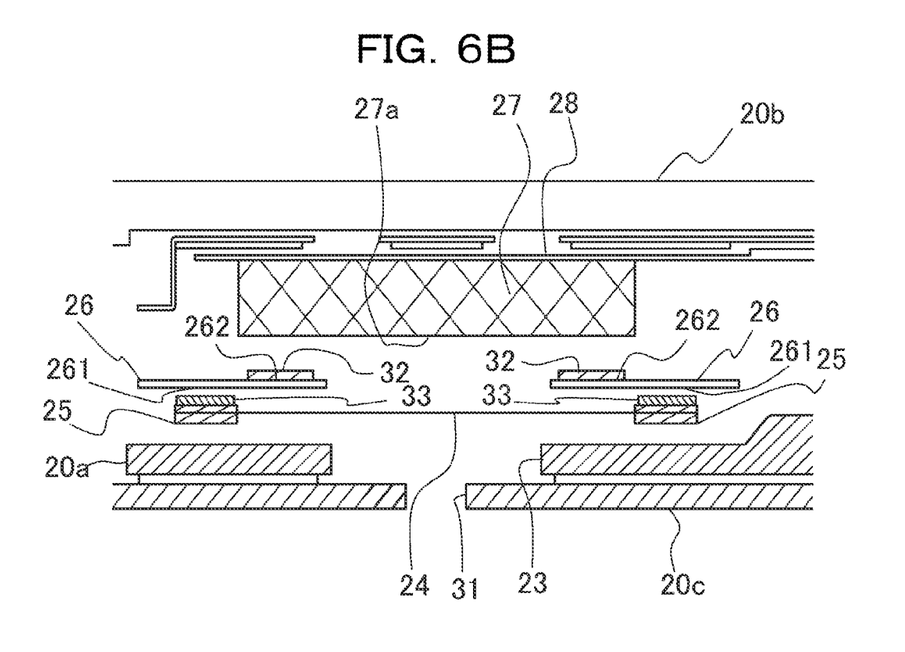
FIG. 6B illustrates components in FIG. 6A in an exploded manner.

FIG. 6A illustrates the movable portion in an assembled manner in section taken along the line B-B in FIGS. 2 and 5. FIG. 6B illustrates components in FIG. 6A in an exploded manner.

As illustrated in FIGS. 5, 6A and 6B, the movable portion 3 of the mobile phone 1 includes therein a sheet member 24. The sheet member 24 is formed of a water repellent material like the sheet member 12. Specifically, tetrafluoroethylene is formed into a porous sheet and used. The sheet member 24 allows passage of air but blocks passage of water. The sheet member 24 may be formed of other materials as long as it can pass air and block entry of water. The sheet member 24 has a minimum area required based on acoustic characteristics such as sound pressure of the receiver unit 27. The sheet member 24 in this embodiment ensures an area that can sufficiently exhibit acoustic characteristics of the receiver unit 27.

As illustrated in FIG. 6A, the sheet member 24 is provided between the receiver unit 27 and the front case 20a that forms the outer case in a position corresponding to the position of the sound holes 23 and 31. The sheet member 24 is placed over the receiver unit 27 to cover an outside of an outer edge of the receiver unit 27.

Such a relationship between the size of the receiver unit 27 and the area of the sheet member 24 results from the receiver unit 27 being reduced in size while maintaining satisfactory acoustic characteristics. Specifically, a small-sized high performance receiver unit requires a sheet member having an area to cover the receiver unit, and thus such a relationship is established.

A mounting portion 25 mounted to the front case 20a that forms the outer case is circumferentially provided on an outer peripheral portion of the sheet member 24. The mounting portion 25 is formed by bonding a cushion material as an example of a buffer to the outer peripheral portion of the sheet member 24. The mounting portion 25 is mounted in tight contact with an inner peripheral surface of the front case 20a. The mounting portion 25 may be formed of a rigid material instead of the cushion material. The mounting portion 25 is an interposed portion when the sheet member 24 is mounted to the front case 20a. Thus, the mounting portion 25 is circumferentially provided on the outer peripheral portion of the sheet member 24. The mounting portion 25 is provided over the entire outer peripheral portion of the sheet member 24 to ensure a waterproof function. Thus, the mounting portion 25 provided over the entire outer peripheral portion of the sheet member 24 also has a function of preventing sound leakage from the receiver unit 27.

A second extension member 26 is mounted to the mounting portion 25. Specifically, the movable portion 3 has the second extension member 26 that extends the mounting portion 25 toward an inner periphery thereof on a side of the sheet member 24 facing the receiver unit 27. The receiver unit 27 is mounted to the second extension member 26.

The second extension member 26 is a circumferential plate formed of sheet metal and forms an extension portion in the present invention. The extension portion is formed by the circumferential plate. The second extension member 26 formed of sheet metal is formed to be thin while ensuring necessary strength. The second extension member 26 has a mounting piece 26a and is secured to the flexible substrate 28 by the mounting piece 26a.

An outer peripheral portion front surface 261 of the second extension member 26 as the circumferential plate is mounted to the mounting portion 25, and an inner peripheral portion back surface 262 is mounted to the receiver unit 27. A double-faced tape 33 as an example of a buffer is provided between the second extension member 26 and the mounting portion 25. A double-faced tape 32 as an example of a buffer is also provided between the second extension member 26 and the receiver unit 27. The double-faced tapes 32 and 33 provide a bonding function, also increase sealability around the receiver unit 27, and prevent sound leak from the receiver unit 27. The double-faced tape 32 is placed on the outer periphery of the receiver unit 27 so as not to close a sound emitting portion 27a of the receiver unit 27. A cushion material may replace the double-faced tape 32. An adhesive may be used to bond the second extension member 26 to the mounting portion 25 and bond the second extension member 26 to the receiver unit 27.

Thus, the second extension member 26 is provided to prevent the small-sized receiver unit 27 from coming into direct contact with the sheet member 24. This can avoid breakage or failure of the sheet member 24, and maintain a waterproof effect of the movable portion 3. As described above, the sheet member 24 ensures the area that can sufficiently exhibit acoustic characteristics of the receiver unit 27. The second extension member 26 does not come into direct contact with the sheet member 24, and a gap is formed between the second extension member 26 and the sheet member 24. Thus, the area of the sheet member 24 that has an influence on acoustic characteristics is not reduced. Therefore, the second extension member 26 does not deteriorate the acoustic characteristics of the receiver unit 27.

As described above, the waterproof effect of the movable portion 3 is ensured. The acoustic effect of the mobile phone 1 is also maintained.

As described above, in the mobile phone 1 of this embodiment, the extension portion is provided on the mounting portion of the water repellent sheet member for making the acoustic unit waterproof, thereby allowing a waterproof effect to be maintained while ensuring the area of the sheet member. Specifically, even if a small-sized acoustic unit is used, the acoustic unit does not come into direct contact with the sheet member, thereby avoiding breakage or failure of the sheet member. The break or failure of the sheet member is avoided to maintain a waterproof effect of the electronic device. The sheet member can ensure a desired area, and this can exhibit acoustic characteristics of the acoustic unit and also maintain acoustic characteristics of the electronic device.

The same waterproof structure may be applied to a microphone unit. In short, the waterproof structure is applicable to a spot where an outer case has a sound emitting hole and a sheet member is provided for providing a waterproof effect.

The waterproof structure is applicable to a general purpose acoustic unit by providing a first extension member 14 or a second extension member 26 separately from a mounting portion 13 or a mounting portion 25.

[Embodiment 2]

Figure 7:
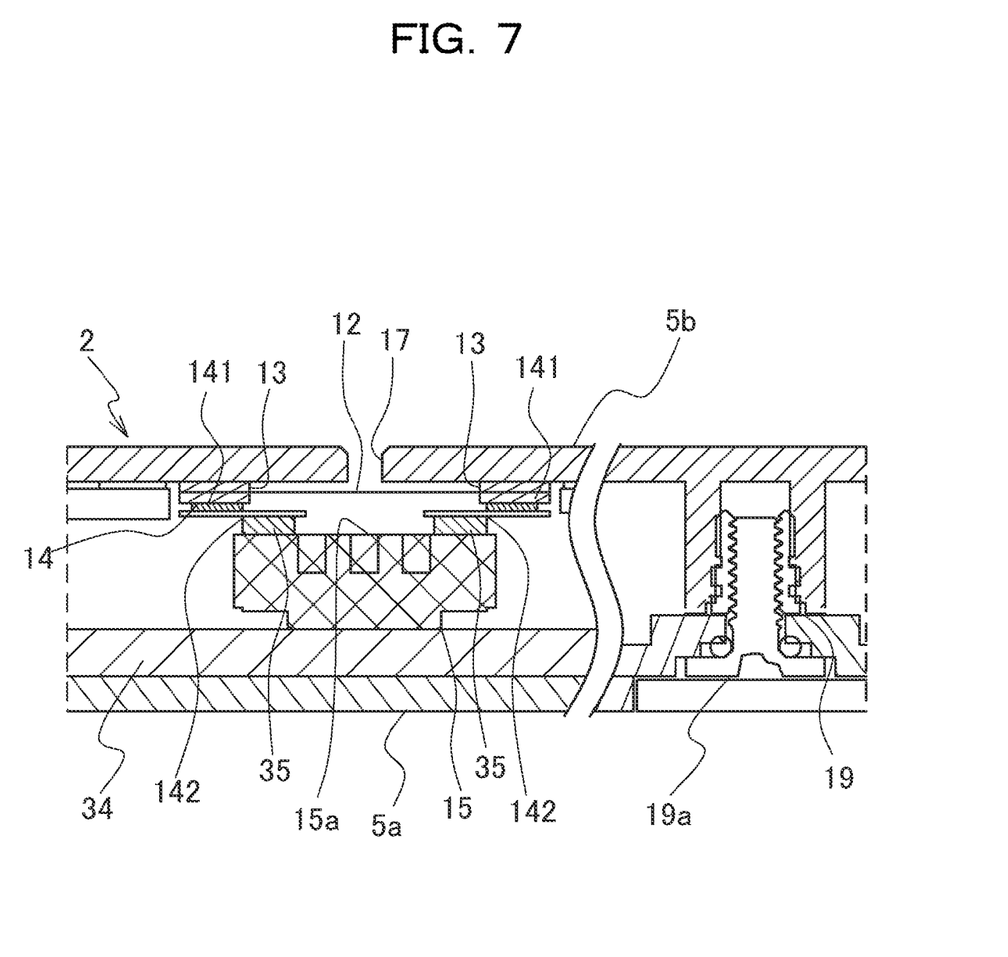
FIG. 7 is a sectional view of a fixed portion in Embodiment 2.

Next, Embodiment 2 will be described with reference to FIG. 7. FIG. 7 corresponds to FIG. 4A in Embodiment 1 and illustrates in section a part of a fixed portion 2.

Embodiment 2 is different from Embodiment 1 in that a cushion material 35 replaces the double-faced tape 16, and a plate 34 is provided between a speaker unit 15 and a front case 5a. The cushion material 35 does not have a bonding property unlike the double-faced tape 16.

The front case 5a and a rear case 5b are assembled by fastening a screwing portion 19 with a screw 19a as illustrated in FIG. 7. The plate 34 is provided between the speaker unit 15 and the front case 5a to press the speaker unit 15 against the rear case 5b. This can ensure sealability between the speaker unit 15 and the first extension member 14. Such a configuration can increase sealability around the speaker unit 15, and prevent sound leakage from the speaker unit 15.

The preferred embodiments of the present invention have been described above in detail, but the present invention is not limited to the specific embodiments. Various modifications or changes may be made within the scope of the gist of the present invention described in the claims.

For example, the embodiment takes a mobile phone as an example of an electronic device, but the electronic device may be, for example, a personal digital assistant (PDA) or a game machine. Specifically, the present invention is applicable to an electronic device in which an outer case includes therein an acoustic unit and an inside of the outer case needs to be made waterproof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention has been described in detail, it should be understood that various changes, substitutions, and alterations could be made hereto without departing from the spirit and scope of the invention.

What is claimed is:

1. An electronic device comprising:
   an outer case having a sound hole;
   an acoustic unit included in the outer case in a position corresponding to a position of the sound hole;
   a sheet member provided between the acoustic unit and the outer case in a position corresponding to the position of the sound hole, and placed over the acoustic unit to cover an outside of an outer edge of the acoustic unit;
   a mounting portion circumferentially provided on an outer peripheral portion of the sheet member and mounted to the outer case; and
   an extension portion that extends beyond the mounting portion toward an inner periphery thereof on a side of the sheet member facing the acoustic unit and mounted to the acoustic unit.

2. The electronic device according to claim 1, wherein the extension portion is formed by a circumferential plate provided between the sheet member and the acoustic unit.

3. The electronic device according to claim 1, wherein the extension portion is formed by a circumferential plate provided between the sheet member and the acoustic unit, an outer peripheral portion front surface of the circumferential plate is mounted to the mounting portion, and an inner peripheral portion back surface of the circumferential plate is mounted to the acoustic unit.

4. The electronic device according to claim 1, wherein the extension portion is formed of sheet metal.

5. The electronic device according to claim 1, wherein the mounting portion includes a buffer.

6. The electronic device according to claim 1, wherein a buffer is provided between the extension portion and the acoustic unit.

* * * * *